United States Patent
Katayama (10) Patent No.: US 9,486,384 B2
(45) Date of Patent: Nov. 8, 2016

(54) WALKING ASSIST CART

(71) Applicant: Funai Electric Co., Ltd., Daito-shi, Osaka (JP)

(72) Inventor: Takahiro Katayama, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/744,553

(22) Filed: Jun. 19, 2015

(65) Prior Publication Data

US 2015/0366743 A1   Dec. 24, 2015

(30) Foreign Application Priority Data

Jun. 20, 2014   (JP) .................. 2014-126990

(51) Int. Cl.
  *B60L 9/00* (2006.01)
  *A61H 3/04* (2006.01)
  *B60L 15/20* (2006.01)
  *A61H 3/00* (2006.01)

(52) U.S. Cl.
  CPC .............. *A61H 3/04* (2013.01); *B60L 15/20* (2013.01); *B60L 15/2018* (2013.01); *A61H 2003/002* (2013.01); *A61H 2003/043* (2013.01); *A61H 2201/1635* (2013.01); *A61H 2201/50* (2013.01); *A61H 2201/5061* (2013.01); *A61H 2201/5069* (2013.01); *A61H 2201/5079* (2013.01); *A61H 2201/5084* (2013.01); *B60L 2200/22* (2013.01); *B60L 2200/40* (2013.01); *B60L 2240/12* (2013.01); *B60L 2240/18* (2013.01); *B60L 2240/26* (2013.01); *B60L 2240/642* (2013.01); *Y02T 10/645* (2013.01); *Y02T 10/7275* (2013.01); *Y02T 10/7291* (2013.01); *Y02T 90/16* (2013.01)

(58) Field of Classification Search
  USPC .......................................... 701/22
  See application file for complete search history.

(56) References Cited

U.S. PATENT DOCUMENTS

| 5,746,282 | A * | 5/1998 | Fujiwara | B60K 26/02 180/6.2 |
|---|---|---|---|---|
| 6,276,470 | B1 * | 8/2001 | Andreae, Jr. | B62D 51/04 180/11 |
| 8,406,993 | B2 * | 3/2013 | Hannah | A47F 10/04 340/505 |
| 8,706,332 | B2 * | 4/2014 | Kume | B62B 3/001 180/19.3 |
| 2008/0033617 | A1 | 2/2008 | Watanabe et al. | |
| 2015/0122566 | A1 * | 5/2015 | Constien | B62H 1/02 180/210 |

FOREIGN PATENT DOCUMENTS

| JP | 2005-289373 A | 10/2005 |
|---|---|---|
| JP | 2006-42528 A | 2/2006 |
| JP | 2006-96330 A | 4/2006 |
| JP | 5395276 B2 | 10/2013 |
| SG | 190774 A1 | 7/2013 |

* cited by examiner

*Primary Examiner* — Hussein A. Elchanti
(74) *Attorney, Agent, or Firm* — Crowell & Moring LLP (57) ABSTRACT

A walking assist cart includes a cart body on which a load can be placed, a drive portion that drives a drive wheel, an inclination sensor that detects the inclination angle of the cart body, and a controller that acquires the weight of the load placed on the cart body based on the drive force of the drive portion and the inclination angle of the cart body and outputs assist drive force based on the weight of the load that is acquired.

20 Claims, 7 Drawing Sheets

FIG.3 STATE WHERE REST DRIVE FORCE AND COMPONENT FORCE OF GRAVITY ARE BALANCED

FIG.4 DRIVE CONTROL PROCESSING

FIG.5 REST CONTROL PROCESSING (FIRST EMBODIMENT)

FIG.6 LOAD WEIGHT ACQUISITION PROCESSING (FIRST EMBODIMENT)

FIG.7 ASSIST CONTROL PROCESSING (FIRST EMBODIMENT)

FIG.8 ASSIST CONTROL PROCESSING (SECOND EMBODIMENT)

FIG.9 REST CONTROL PROCESSING (THIRD EMBODIMENT)

FIG.11 LOAD WEIGHT ACQUISITION PROCESSING (THIRD EMBODIMENT)

WALKING ASSIST CART

CROSS-REFERENCE TO RELATED APPLICATION

The priority application number JP2014-126990, Walking Assist Cart, Jun. 20, 2014, Takahiro Katayama, upon which this patent application is based is hereby incorporated by reference.

BACKGROUND OF THE INVENTION

1. Field of the Invention

The present invention relates to a walking assist cart, and more particularly, it relates to a walking assist cart including a drive portion.

2. Description of the Background Art

An assist cart including a drive portion is known in general, as disclosed in Japanese Patent No. 5395276.

Japanese Patent No. 5395276 discloses an assist cart including a motor that drives a wheel, a loading platform on which a load is placed, and a weight sensor that detects the weight of the load placed on the loading platform. This assist cart generates a target speed according to the weight of the load detected by the weight sensor and controls the output state of the motor on the basis of the generated target speed. Thus, this assist cart assists a user on the basis of the weight of the load.

In the assist cart according to Japanese Patent No. 5395276, however, it is required to provide the weight sensor that detects the weight of the load in order to assist the user on the basis of the weight of the load. Consequently, the number of components is disadvantageously increased.

SUMMARY OF THE INVENTION

The present invention has been proposed in order to solve the aforementioned problem, and an object of the present invention is to provide a walking assist cart capable of assisting walking of a user on the basis of the weight of a load while suppressing an increase in the number of components.

In order to attain the aforementioned object, a walking assist cart according to an aspect of the present invention includes a cart body including a drive wheel, on which a load is placed, a drive portion that drives the drive wheel, an inclination sensor that detects the inclination angle of the cart body, and a controller that acquires the weight of the load placed on the cart body based on the drive force of the drive portion and the inclination angle of the cart body and outputs assist drive force to assist walking of a user based on the weight of the load that is acquired.

In the walking assist cart according to this aspect of the present invention, as hereinabove described, the controller acquires the weight of the load placed on the cart body on the basis of the drive force of the drive portion and the inclination angle of the cart body. Thus, the weight of the load placed on the cart body can be acquired utilizing the inclination sensor generally provided in the walking assist cart to assist walking of the user according to the inclination angle of the cart body and the drive force of the drive portion as a drive source. Consequently, no weight sensor may be provided separately in the cart body, and hence the weight of the load can be acquired while an increase in the number of components is suppressed. Furthermore, the controller outputs the assist drive force to assist walking of the user on the basis of the weight of the load that is acquired. Thus, walking of the user can be assisted on the basis of the weight of the load placed on the cart body. Consequently, walking of the user can be assisted on the basis of the weight of the load placed on the cart body while an increase in the number of components is suppressed.

In the aforementioned walking assist cart according to this aspect, the drive force of the drive portion preferably includes rest drive force to cause the cart body to rest, and the controller preferably causes the cart body to rest, acquires the weight of the load placed on the cart body based on the rest drive force and the inclination angle of the cart body caused to rest when causing the cart body to rest, and outputs the assist drive force in a direction to cancel out force caused by the weight of the load and of a magnitude that cancels out the force caused by at least the weight of the load according to the weight of the load that is acquired. According to this structure, the weight of the load can be easily acquired utilizing that the rest drive force and the component force of gravity in the inclination direction of the inclined surface generated according to the inclination angle of the cart body and the gravity of the load are balanced when the cart body is caused to rest on the inclined surface on which the cart body is inclined. Furthermore, the assist drive force in which the weight of the load placed on the cart body is reflected can be output, and hence walking of the user can be more properly assisted. In addition, the force caused by the weight of the load can be reliably canceled out by the assist drive force, and hence a burden on the user during walking can be reliably reduced.

In this case, the controller preferably outputs the assist drive force of a magnitude that cancels out at least a portion of force caused by the weight of the cart body in addition to the force caused by the weight of the load. According to this structure, not only the force caused by the weight of the load but also the force caused by the weight of the cart body can be canceled out, and hence a burden on the user during walking can be further reduced.

In the aforementioned structure of outputting the assist drive force of the magnitude that cancels out at least a portion of the force caused by the weight of the cart body in addition to the force caused by the weight of the load, the controller preferably outputs the assist drive force by the following formula (1):

$$Fh:Fa=\alpha \cdot M:\{m+(1-\alpha)M\} \quad (1)$$

where the operation force of the user is Fh, the assist drive force is Fa, the weight of the cart body is M, the weight of the load is m, and a coefficient having a value that is at least 0 and not more than 1 is $\alpha$.

According to this structure, the assist drive force can be easily acquired in consideration of the weight of the load, the weight of the cart body, and the operation force of the user by the aforementioned formula (1).

In the aforementioned structure of outputting the assist drive force of the magnitude that cancels out the force caused by the weight of the load, the controller preferably outputs the assist drive force in a direction to cancel out the component force of gravity in the inclination direction of an inclined surface caused by the weight of the load on the inclined surface and of a magnitude that cancels out the component force of gravity in the inclination direction of the inclined surface caused by at least the weight of the load according to the weight of the load that is acquired when the cart body is arranged on the inclined surface. According to this structure, the assist drive force in the direction to cancel out the component force of gravity in the inclination direction of the inclined surface caused by the weight of the load can be output according to the weight of the load placed on the cart body on the inclined surface on which a burden is easily imposed according to the weight of the load. Consequently, walking of the user can be more properly assisted. Furthermore, the component force of gravity in the inclination direction of the inclined surface caused by the weight of the load can be reliably canceled out by the assist drive force, and hence a burden on the user during walking on the inclined surface can be reliably reduced.

In the aforementioned structure of outputting the assist drive force of the magnitude that cancels out at least a portion of the force caused by the weight of the cart body in addition to the force caused by the weight of the load, the controller preferably outputs the assist drive force in a direction to cancel out the component force of gravity in the inclination direction of an inclined surface caused by the weight of the load and the weight of the cart body on the inclined surface and of a magnitude that cancels out the component force of gravity in the inclination direction of the inclined surface caused by the weight of the load and the weight of the cart body according to the weight of the load that is acquired when the cart body is arranged on the inclined surface. According to this structure, the assist drive force in the direction to cancel out not only the component force of gravity in the inclination direction of the inclined surface caused by the weight of the load but also the component force of gravity in the inclination direction of the inclined surface caused by the weight of the cart body can be output. Consequently, walking of the user can be more properly assisted. Furthermore, not only the component force of gravity in the inclination direction of the inclined surface caused by the weight of the load but also the component force of gravity in the inclination direction of the inclined surface caused by the weight of the cart body can be reliably canceled out by the assist drive force, and hence a burden on the user during walking on the inclined surface can be further reduced.

In this case, the controller preferably outputs the assist drive force by the following formula (2):

$$Fh:(Fa-Fg)=\alpha \cdot M:\{m+(1-\alpha)M\} \quad (2)$$

where the operation force of the user is Fh, the assist drive force is Fa, the component force of gravity in the inclination direction of the inclined surface caused by the weight of the load and the weight of the cart body is Fg, the weight of the cart body is M, the weight of the load is m, and a coefficient having a value that is at least 0 and not more than 1 is α.

According to this structure, the assist drive force can be easily acquired in consideration of the weight of the load, the weight of the cart body, the operation force of the user, and the component force of gravity in the inclination direction of the inclined surface caused by the weight of the load and the weight of the cart body by the aforementioned formula (2).

In the aforementioned structure of outputting the assist drive force by the aforementioned formula (2), the drive portion preferably includes a drive motor, and the controller preferably causes the cart body to rest and acquires the weight of the load placed on the cart body based on the current value of current that flows in the drive motor to cause the cart body to rest and the inclination angle of the cart body when causing the cart body to rest. According to this structure, a current detection mechanism generally provided to control the drive motor can detect the drive force of the drive motor by the current value. Consequently, an increase in the number of components due to detection of the drive force can be suppressed, and hence the weight of the load can be acquired by the simpler structure.

In this case, the controller preferably acquires the weight of the load placed on the cart body by the following formula (3):

$$m=\{K \cdot Is/(g \cdot \sin \theta)\}-M \quad (3)$$

where the weight of the cart body is M, the weight of the load is m, the inclination angle of the cart body is θ, the gravity acceleration is g, a proportional constant related to the drive motor is K, and the current value of the current that flows in the drive motor to cause the cart body to rest is Is.

According to this structure, the weight of the load can be easily acquired by the aforementioned formula (3) utilizing the current value of the drive motor.

In the aforementioned structure of outputting the assist drive force of the magnitude that cancels out the force caused by the weight of the load, the drive portion preferably includes a drive motor, the controller preferably gradually reduces an absolute value for the current value of current that flows in the drive motor to cause the cart body to rest after causing the cart body to rest and causes the cart body to rest again when the cart body is moved again, and the controller preferably acquires the weight of the load placed on the cart body based on the current value of the current that flows in the drive motor to cause the cart body to rest and the inclination angle of the cart body when causing the cart body to rest again. The current value of the current that flows in the drive motor to cause the cart body to rest conceivably varies from rest current value acquisition operation to rest current value acquisition operation by frictional resistance between mechanical components of the drive motor, frictional resistance between drive wheel and a road surface, etc. even on the same road surface. Thus, according to this structure, even when the current value for causing the cart body to rest becomes larger than a minimum current value necessary to cause the cart body to rest, the cart body is caused to rest again in order to obtain the minimum current value necessary to cause the cart body to rest, and hence variations in the current value of the current that flows in the drive motor to cause the cart body to rest can be significantly reduced or prevented. Consequently, variations in the weight of the load acquired on the basis of at least the current value can be significantly reduced or prevented. Therefore, variations in the assist drive force acquired on the basis of the weight of the load can be significantly reduced or prevented, and hence the user can receive stable walking assistance.

In the aforementioned structure of outputting the assist drive force of the magnitude that cancels out at least a portion of the force caused by the weight of the cart body in addition to the force caused by the weight of the load, the drive portion preferably includes a drive motor, the controller preferably gradually reduces an absolute value for the current value of current that flows in the drive motor to cause the cart body to rest after causing the cart body to rest and causes the cart body to rest again when the cart body is moved again, and the controller preferably acquires the weight of the load placed on the cart body based on the current value of the current that flows in the drive motor to cause the cart body to rest and the inclination angle of the cart body when causing the cart body to rest again. According to this structure, similarly to the aforementioned case, variations in the assist drive force acquired on the basis of the weight of the load can be significantly reduced or prevented, and hence the user can receive stable walking assistance.

In the aforementioned structure of outputting the assist drive force of the magnitude that cancels out the component force of gravity in the inclination direction of the inclined surface caused by the weight of the load, the drive portion preferably includes a drive motor, the controller preferably gradually reduces an absolute value for the current value of current that flows in the drive motor to cause the cart body to rest after causing the cart body to rest and causes the cart body to rest again when the cart body is moved again, and the controller preferably acquires the weight of the load placed on the cart body based on the current value of the current that flows in the drive motor to cause the cart body to rest and the inclination angle of the cart body when causing the cart body to rest again. According to this structure, similarly to the aforementioned case, variations in the assist drive force acquired on the basis of the weight of the load can be significantly reduced or prevented, and hence the user can receive stable walking assistance.

In the aforementioned structure of outputting the assist drive force of the magnitude that cancels out the component force of gravity in the inclination direction of the inclined surface caused by the weight of the load and the weight of the cart body, the drive portion preferably includes a drive motor, the controller preferably gradually reduces an absolute value for the current value of current that flows in the drive motor to cause the cart body to rest after causing the cart body to rest and causes the cart body to rest again when the cart body is moved again, and the controller preferably acquires the weight of the load placed on the cart body based on the current value of the current that flows in the drive motor to cause the cart body to rest and the inclination angle of the cart body when causing the cart body to rest again. According to this structure, similarly to the aforementioned case, variations in the assist drive force acquired on the basis of the weight of the load can be significantly reduced or prevented, and hence the user can receive stable walking assistance.

In the aforementioned structure of outputting the assist drive force by the aforementioned formula (2), the drive portion preferably includes a drive motor, the controller preferably gradually reduces an absolute value for the current value of current that flows in the drive motor to cause the cart body to rest after causing the cart body to rest and causes the cart body to rest again when the cart body is moved again, and the controller preferably acquires the weight of the load placed on the cart body based on the current value of the current that flows in the drive motor to cause the cart body to rest and the inclination angle of the cart body when causing the cart body to rest again. According to this structure, similarly to the aforementioned case, variations in the assist drive force acquired on the basis of the weight of the load can be significantly reduced or prevented, and hence the user can receive stable walking assistance.

The aforementioned structure of causing the cart body to rest preferably further includes a speed sensor that detects the movement speed of the cart body, and the controller preferably determines whether or not the cart body is at rest based on the movement speed detected by the speed sensor. According to this structure, whether or not the cart body is at rest can be reliably determined, and hence the weight of the load can be reliably acquired.

In this case, the controller preferably determines whether or not the cart body is at rest at a prescribed time interval and acquires the weight of the load placed on the cart body when determining that the cart body is at rest. According to this structure, the weight of the load can be acquired at the prescribed time interval, and hence the weight of the current load can be promptly acquired even when the load placed on the cart body is increased or decreased in weight.

In the aforementioned structure including the speed sensor, the speed sensor preferably detects the movement speed of the cart body by detecting the rotation speed of the drive portion. According to this structure, the movement speed of the cart body can be easily detected by the speed sensor.

The aforementioned walking assist cart according to this aspect preferably further includes an operation force sensor that detects the operation force of the user on the cart body, and the controller preferably outputs the assist drive force according to the operation force detected by the operation force sensor. According to this structure, the assist drive force appropriate for the operation force of the user can be output unlike the case where the assist drive force is acquired regardless of the operation force of the user. Consequently, assistance in walking of the user provided by the excessive assist drive force can be suppressed, and hence walking of the user can be stably assisted.

In this case, the walking assist cart preferably further includes a grip portion gripped by the user, and the operation force sensor is preferably provided in the grip portion. According to this structure, the operation force sensor is provided in the grip portion to which the operation force is transmitted from the user, and hence the operation force of the user can be reliably and accurately detected by the operation force sensor.

In the aforementioned walking assist cart according to this aspect, the inclination sensor preferably includes an acceleration sensor or a gyro sensor. According to this structure, the inclination angle of the cart body can be easily detected by the acceleration sensor or the gyro sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

(First Embodiment)

The structure of a walking assist cart 100 according to a first embodiment of the present invention is now described with reference to FIGS. 1 and 2.

Figure 1:
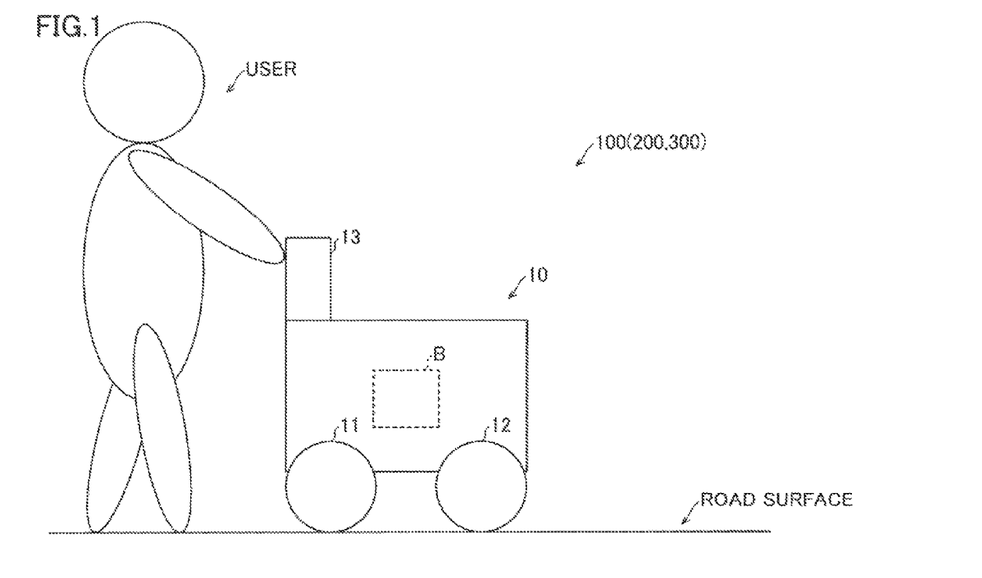
FIG. 1 illustrates the overall structure of a walking assist cart according to a first embodiment of the present invention.

The walking assist cart 100 according to the first embodiment of the present invention includes a cart body 10 on which a load B (shown by a broken line) can be placed, as shown in FIG. 1. The cart body 10 includes a pair of right and left drive wheels 11 (one drive wheel is only illustrated), a pair of right and left free wheels 12 (one free wheel is only illustrated), and a grip portion 13. This walking assist cart 100 assists walking of a user when the user grips the grip portion 13 and moves the cart body 10 forward or reversely.

Figure 2:
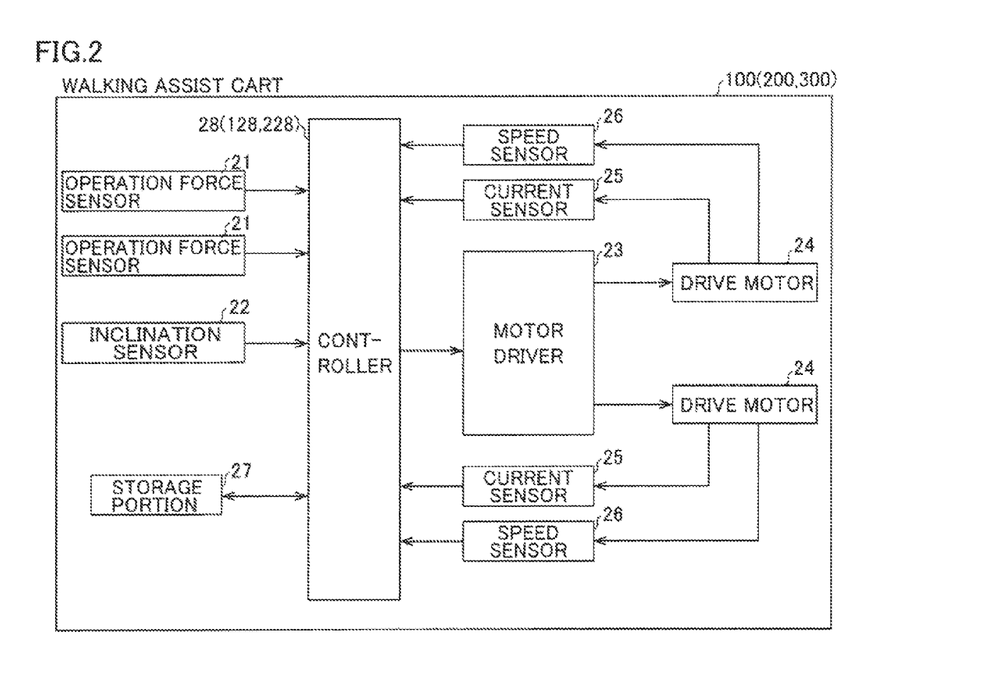
FIG. 2 is a block diagram showing the overall structure of the walking assist cart according to the first embodiment of the present invention.

As shown in FIG. 2, the walking assist cart 100 includes two operation force sensors 21, an inclination sensor 22, a motor driver 23, two drive motors 24, two current sensors 25, two speed sensors 26, a storage portion 27, and a controller 28. The drive motors 24 are examples of the "drive portion" in the present invention.

The operation force sensors 21 are provided in the grip portion 13 and detects the operation force (force of pushing and pulling the cart body 10) of the user. Specifically, the operation force sensors 21 detect the direction and magnitude of the operation force of the user. The two respective operation force sensors 21 are provided on the left side and the right side of the grip portion 13 relative to the center in a right-left direction. Thus, the two respective operation force sensors 21 can detect operation force associated with the left hand of the user and operation force associated with the right hand of the user individually.

Figure 3:
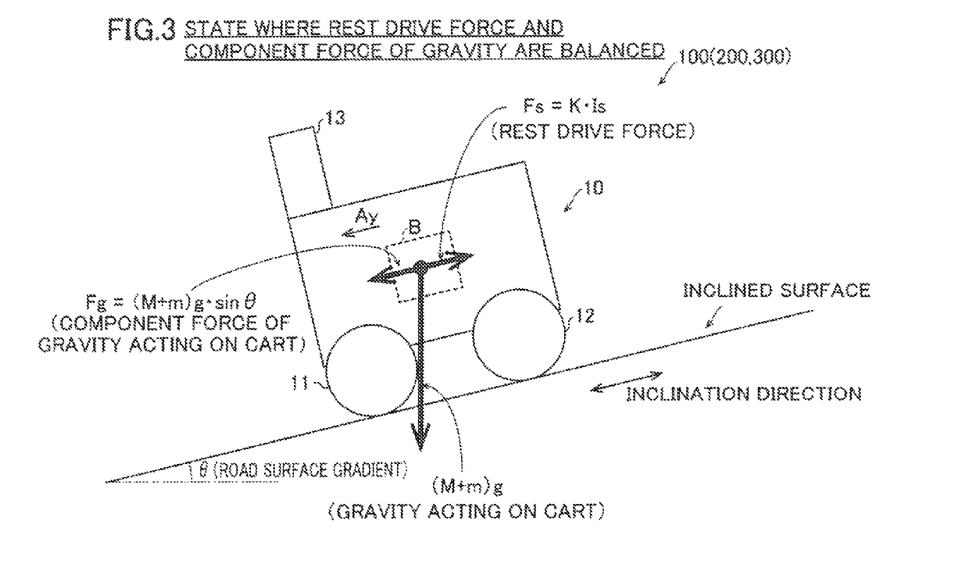
FIG. 3 is a diagram for illustrating the state of the walking assist cart according to the first embodiment of the present invention in which rest drive force and the component force of gravity are balanced on an inclined surface.

The inclination sensor 22 includes an acceleration sensor and detects the inclination angle of the cart body 10. Specifically, the inclination sensor 22 detects a road surface gradient (the inclination angle of an inclined surface) θ as the inclination angle of the cart body 10 relative to the horizontal line of a road surface, as shown in FIG. 3.

The motor driver 23 controls current that flows in the two drive motors 24 on the basis of control of the controller 28. Specifically, the motor driver 23 controls turning on and off of the current that flows in the drive motors 24, controls the flow direction of the current, and controls the magnitude (current value) of the current on the basis of control of the controller 28.

The drive motors 24 generate drive force according to the current value of the current that flows therein on the basis of control of the motor driver 23. The two respective drive motors 24 are coupled to the right and left drive wheels 11 by unshown axle shafts. The two respective drive motors 24 drive the right and left drive wheels 11 coupled through the unshown axle shafts individually by the generated drive force.

The two current sensors 25 each detect the drive force of a corresponding drive motor 24 by detecting the current that flows in the corresponding drive motor 24. The controller 28 controls the motor driver 23 on the basis of the current detected by the current sensors 25 and adjusts the drive force of the drive motors 24.

The speed sensors 26 detect the movement speed of the cart body 10 by detecting the rotation speed of shafts of the drive motors 24. The two speed sensors 26 each detect the rotation speed of a shaft of a corresponding drive motor 24.

The storage portion 27 includes a ROM, which is a non-volatile memory, and a RAM, which is a volatile memory. The storage portion 27 stores various types of data, programs, etc. employed by the controller 28. More specifically, the storage portion 27 stores programs or the like associated with drive control processing, rest control processing, assist control processing, and load weight acquisition processing, described later.

The controller 28 controls each component of the walking assist cart 100. The structure of the controller 28 related to the assistance of the walking assist cart 100 for the user is now described.

The controller 28 performs control (assist control) of assisting walking of the user and control (rest control) of causing the cart body 10 to rest. The control of assisting walking of the user is control for partially assisting force required for the user to travel in a travel direction by the assist drive force of the drive motors 24 when the user walks. The control of causing the cart body 10 to rest is control for maintaining the cart body 10 at a stop position by the rest drive force of the drive motors 24 when the user stops on the inclined surface or the like. In other words, the assist drive force is drive force for assisting walking of the user, and the rest drive force is drive force for causing the cart body 10 to rest.

The user places the load B on the cart body 10 of the walking assist cart 100. Therefore, it is conceivably preferable to acquire assist drive force according to the weight of the placed load B at the time of assist control of the controller 28.

According to the first embodiment, the controller 28 performs rest control of causing the cart body 10 to rest and acquires the weight of the load B placed on the cart body on the basis of rest drive force and the inclination angle of the cart body when causing the cart body 10 to rest. The controller 28 acquires assist drive force in a direction to cancel out inertia force caused by the weight of the load B and of a magnitude that cancels out the inertia force caused by at least the weight of the load B according to the acquired weight of the load B and outputs the assist drive force. The controller 28 controls the drive motors 24 through the motor driver 23 to generate the acquired assist drive force. Thus, the drive motors 24 generate the assist drive force and drive the drive wheels 11 by the generated assist drive force.

Control of acquiring the weight of the load B is now described in detail with reference to FIG. 3.

FIG. 3 shows a state where the walking assist cart 100 is at rest on the inclined surface. More specifically, FIG. 3 shows a state where rest drive force (Fs) and the component force (Fg) of gravity in the inclination direction of the inclined surface are balanced (a state where Fs=Fg). At this time, current of a current value Is corresponding to the rest drive force Fs flows in the drive motors 24. Therefore, Fs can be expressed by Fs=K·Is where K is a proportional constant. The proportional constant K is a value related to the performance of the drive motors 24 and the radii of the drive wheels 11 and properly determined at the time of design. The component force Fg of gravity can be expressed by Fg=(M+m)g·sin θ where the weight of the cart body 10 is M, the weight of the load B is m, the gravity acceleration is g, and the road surface gradient is θ. The following formula (4) is obtained by the relationship of Fs=Fg.

$$K \cdot Is = (M+m)g \cdot \sin\theta \quad (4)$$

The formula (4) is modified, whereby the following formula (5) for obtaining the weight m of the load B is obtained.

$$m = \{K \cdot Is/(g \cdot \sin\theta)\} - M \quad (5)$$

The proportional constant K, the gravity acceleration g, and the weight M of the cart body 10 are known values. On the other hand, the current value Is corresponding to the rest drive force Fs and the road surface gradient θ are values varied according to conditions in which the cart body 10 rests and acquired by the current sensors 25 and the inclination sensor 22, respectively. Therefore, the current sensors 25 and the inclination sensor 22 acquire the current value Is and the road surface gradient θ, respectively, whereby the controller 28 can acquire the weight m of the load B.

In the case where the inclination sensor 22 is an acceleration sensor, the road surface gradient θ can be obtained by the following formula (6).

$$\theta = \sin^{-1}(Ay/g) \quad (6)$$

In the formula (6), Ay (see FIG. 3) is acceleration due to the component force of gravity in the inclination direction of the inclined surface and is directly detected by the acceleration sensor.

Control of acquiring the assist drive force Fa according to the acquired weight m of the load B is now described in detail.

The controller 28 acquires the assist drive force Fa on the basis of the following formula (7).

$$Fh:Fa = \alpha \cdot M:\{m+(1-\alpha)M\} \quad (7)$$

In the formula (7), Fh is the operation force of the user, α is a partition coefficient having a value that is at least 0 and not more than 1. The operation force of the user Fh is detected by the operation force sensor 21. The partition coefficient α is properly determined at the time of design.

The formula (7) is a formula expressing a ratio of force that the user bears to force that drive motors 24 bear. When α=1, for example, the formula (7) shows that the user bears inertia force caused by the weight M of the cart body 10 and the drive motors 24 bear inertia force caused by the weight m of the load B. When α=0.5, the formula (7) shows that the user bears half of the inertia force caused by the weight M of the cart body 10 and the drive motors 24 bear the remaining half of the inertia force caused by the weight M of the cart body 10 and the inertia force caused by the weight m of the load B. Therefore, the assist drive force Fa is acquired (calculated) such that the operation force Fh of the user and the assist drive force Fa yield the ratio of the formula (7), whereby the assist drive force Fa of the magnitude that cancels out the inertia force caused by at least the weight m of the load B can be acquired. Consequently, the walking assist cart 100 bears the inertia force caused by the weight m of the load B, and hence the user can operate the walking assist cart 100 without being aware of the inertia force caused by the weight m of the load.

Processing performed by the controller 28 in the walking assist cart 100 is now described on the basis of flowcharts with reference to FIGS. 4 to 7. First, the drive control processing for determining rest control and assist control is described on the basis of a flowchart with reference to FIG. 4.

Figure 4:
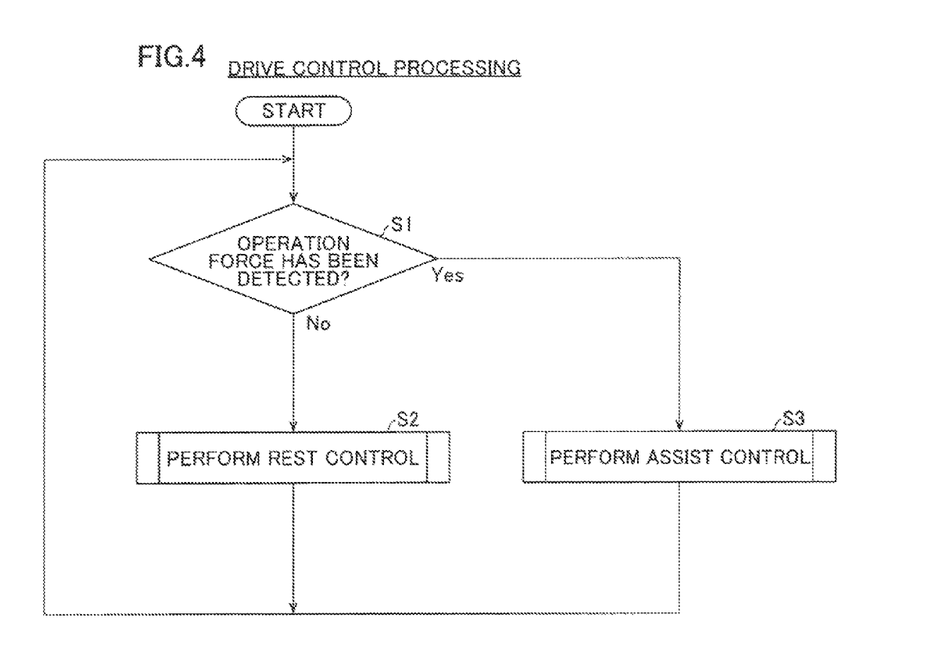
FIG. 4 is a flowchart for illustrating drive control processing in the walking assist cart according to the first embodiment of the present invention.

As shown in FIG. 4, the controller 28 (see FIG. 2) determines whether or not operation force has been detected at a step S1. Specifically, the controller 28 determines whether or not at least one of the two operation force sensors 21 (see FIG. 2) has detected operation force. When determining that no operation force has been detected, the controller 28 performs rest control (see FIG. 5) at a step S2. When determining that operation force has been detected, the controller 28 performs assist control (see FIG. 7) at a step S3. More specifically, the drive control processing is processing for determining whether the walking assist cart 100 performs rest control or assist control. This drive control processing is performed every millisecond.

Figure 5:
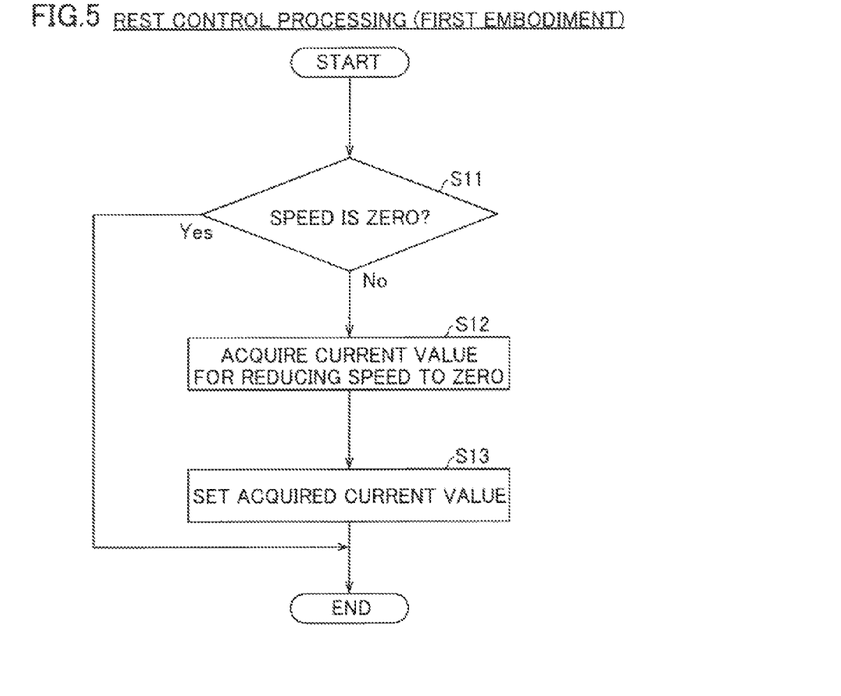
FIG. 5 is a flowchart for illustrating rest control processing in the walking assist cart according to the first embodiment of the present invention.

The rest control processing at the step S2 in the drive control processing of the walking assist cart 100 shown in FIG. 4 is now described in detail on the basis of a flowchart with reference to FIG. 5.

As shown in FIG. 5, the controller 28 determines whether or not the movement speed of the cart body 10 is zero at a step S11. Specifically, the controller 28 determines whether or not the movement speed of the cart body 10 acquired by the two speed sensors 26 is zero. When determining that the movement speed of the cart body 10 is zero, the controller 28 terminates the rest control processing and returns to the step S1 (see FIG. 4) in the drive control processing. When determining that the movement speed of the cart body 10 is not zero, the controller 28 advances to a step S12.

At the step S12, the controller 28 acquires (calculates) a current value for achieving a state where the speed is zero in order to cause the cart body 10 to rest.

At a step S13, the controller 28 sets the current value acquired at the step S12 in the motor driver 23. Thus, the magnitude (current value) of the current that flows in the drive motors 24 is controlled by the motor driver 23, and the movement speed of the cart body 10 is reduced. Then, the controller 28 terminates the rest control processing and returns to the step S1 (see FIG. 4) in the drive control processing. In a state where no operation force is detected, the controller 28 repeats the processing at the steps S11 to S13 until the movement speed of the cart body 10 is reduced to zero. When the movement speed of the cart body 10 is reduced to zero, the current value of the current that flows in the drive motors 24 is the aforementioned current value Is corresponding to the rest drive force Fs.

Figure 6:
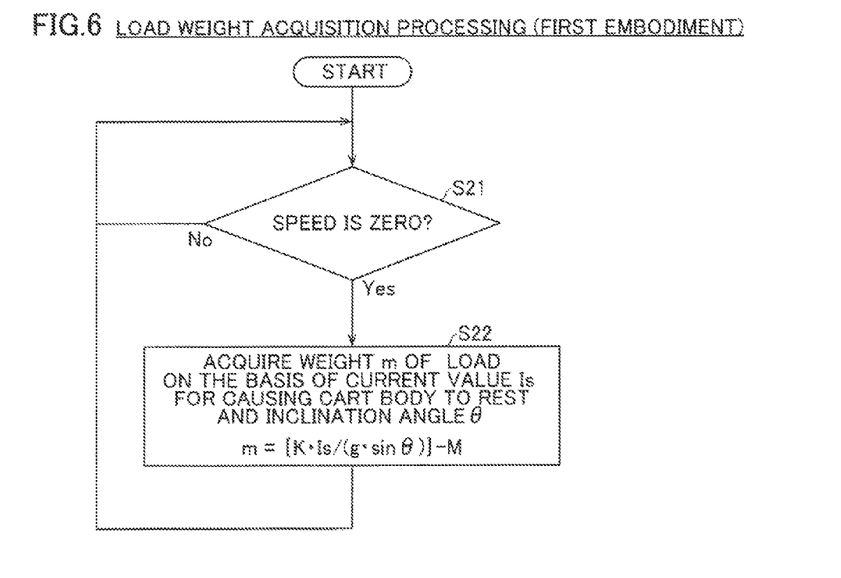
FIG. 6 is a flowchart for illustrating load weight acquisition processing in the walking assist cart according to the first embodiment of the present invention.

The load weight acquisition processing in the walking assist cart 100 is now described on the basis of a flowchart with reference to FIG. 6.

As shown in FIG. 6, the controller 28 determines whether or not the movement speed of the cart body 10 is zero at a step S21. More specifically, the controller 28 determines whether or not the cart body 10 is at rest. When determining that the movement speed of the cart body 10 is not zero (the cart body 10 is not at rest), the controller 28 repeats the processing at the step S21. When determining that the movement speed of the cart body 10 is zero (the cart body 10 is at rest), the controller 28 advances to a step S22.

At the step S22, the controller 28 acquires (calculates) the weight m of the load B on the basis of the current value Is for causing the cart body 10 to rest and the inclination angle (road surface gradient) θ of the cart body 10. Specifically, the controller 28 acquires (calculates) the weight m of the load B by substituting the current value Is and the inclination angle θ into the aforementioned formula (5). In the walking assist cart 100, the load weight acquisition processing is performed every two seconds unlike the drive control processing in FIG. 4. Therefore, the weight m of the current load B can be promptly acquired even when the load B is increased or decreased in weight.

Figure 7:
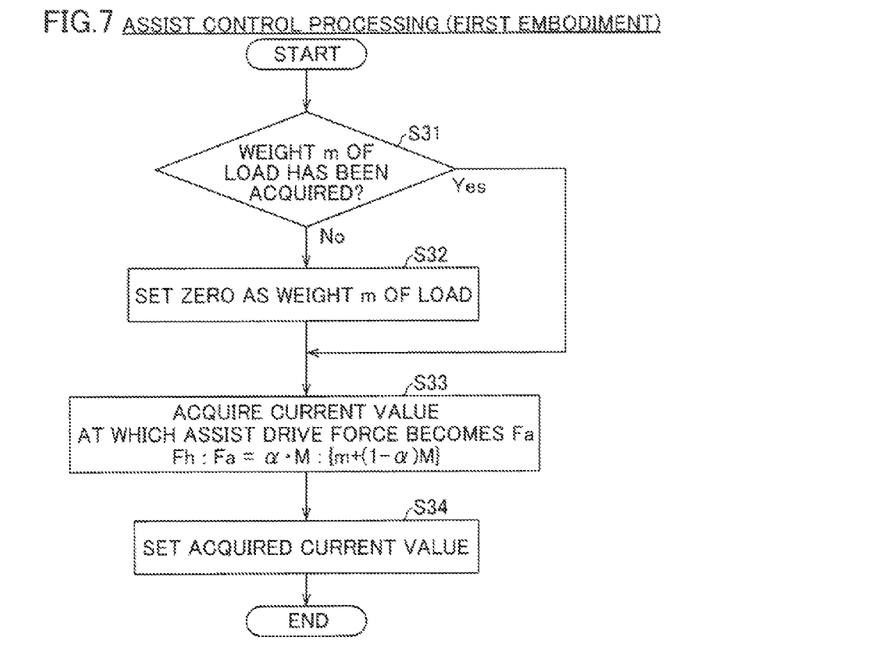
FIG. 7 is a flowchart for illustrating assist control processing in the walking assist cart according to the first embodiment of the present invention.

The assist control processing at the step S3 in the drive control processing of the walking assist cart 100 shown in FIG. 4 is now described in detail on the basis of a flowchart with reference to FIG. 7.

As shown in FIG. 7, the controller 28 determines whether or not the weight m of the load has been acquired at a step S31. When determining that the weight m of the load has been acquired, the controller 28 advances to a step S33. When determining that the weight m of the load has not been acquired, the controller 28 advances to a step S32.

When determining that the weight m of the load has not been acquired, the controller 28 sets zero as the weight m of the load at the step S32. A prescribed value other than zero may be set as the weight m of the load.

The controller 28 acquires (calculates) a current value at which the assist drive force becomes Fa at a step S33. Specifically, the controller 28 acquires (calculates) a current value corresponding to the assist drive force Fa acquired (calculated) on the basis of the following formula (7).

Then, the controller 28 sets the acquired current value in the motor driver 23 at a step S34. Thus, the magnitude (current value) of the current that flows in the drive motors 24 is controlled by the motor driver 23, and walking of the user is assisted by the assist drive force Fa. Then, the controller 28 terminates the assist control processing and returns to the step S1 (see FIG. 4) in the drive control processing. Consequently, walking of the user continues to be assisted in a state where the operation force is detected.

According to the first embodiment, the following effects can be obtained.

According to the first embodiment, as hereinabove described, the controller 28 acquires the weight (m) of the load B placed on the cart body 10 on the basis of the rest drive force (Fs=K·Is) of the drive motors 24 and the inclination angle (θ) of the cart body 10. Thus, the weight of the load B placed on the cart body 10 can be acquired utilizing the inclination sensor 22 generally provided in the walking assist cart 100 to assist walking of the user according to the inclination angle of the cart body 10 and the rest drive force of the drive motors 24 as drive sources. Consequently, no weight sensor may be provided separately in the cart body 10, and hence the weight of the load B can be acquired while an increase in the number of components is suppressed. Furthermore, the controller 28 outputs the assist drive force (Fa) to assist walking of the user on the basis of the acquired weight of the load B. Thus, walking of the user can be assisted on the basis of the weight of the load B placed on the cart body 10. Consequently, walking of the user can be assisted on the basis of the weight of the load B placed on the cart body 10 while an increase in the number of components is suppressed.

According to the first embodiment, as hereinabove described, the controller 28 causes the cart body 10 to rest and acquires the weight of the load B placed on the cart body 10 on the basis of the rest drive force and the inclination angle of the cart body 10 caused to rest when causing the cart body 10 to rest. Furthermore, the controller 28 outputs the assist drive force in the direction to cancel out the force caused by the weight of the load B and of the magnitude that cancels out the force caused by at least the weight of the load B according to the acquired weight of the load B. Thus, the weight of the load B can be easily acquired utilizing that the rest drive force (Fs) and the component force ((M+m)g·sin θ) of gravity in the inclination direction of the inclined surface generated according to the inclination angle of the cart body 10 and the gravity of the load B are balanced when the cart body 10 is caused to rest on the inclined surface on which the cart body 10 is inclined. Furthermore, the assist drive force in which the weight of the load B placed on the cart body 10 is reflected can be output, and hence walking of the user can be more properly assisted. In addition, the force caused by the weight of the load B can be reliably canceled out by the assist drive force, and hence a burden on the user during walking can be reliably reduced.

According to the first embodiment, as hereinabove described, the controller 28 outputs the assist drive force of a magnitude that cancels out at least a portion of force caused by the weight of the cart body 10 in addition to the force caused by the weight of the load B. Thus, not only the force caused by the weight of the load B but also the force caused by the weight of the cart body 10 can be canceled out, and hence a burden on the user during walking can be further reduced.

According to the first embodiment, as hereinabove described, the controller 28 outputs the assist drive force by the aforementioned formula (7), where the operation force of the user is Fh, the assist drive force is Fa, the weight of the cart body 10 is M, the weight of the load B is m, and the coefficient having a value that is at least 0 and not more than 1 is α. Thus, the assist drive force can be easily acquired in consideration of the weight of the load B, the weight of the cart body 10, and the operation force of the user by the aforementioned formula (7).

According to the first embodiment, as hereinabove described, the controller 28 causes the cart body 10 to rest and acquires the weight of the load B placed on the cart body 10 on the basis of the current value (Is) of the current that flows in the drive motors 24 to cause the cart body 10 to rest and the inclination angle of the cart body 10 when causing the cart body 10 to rest. Thus, the current sensors 25 generally provided to control the drive motors 24 can detect the rest drive force of the drive motors 24 by the current value. Consequently, an increase in the number of components due to detection of the rest drive force can be suppressed, and hence the weight of the load B can be acquired by the simpler structure.

According to the first embodiment, as hereinabove described, the controller 28 acquires the weight of the load B placed on the cart body 10 by the aforementioned formula (5), where the weight of the cart body 10 is M, the weight of the load B is m, the inclination angle of the cart body 10 is θ, the gravity acceleration is g, the proportional constant related to the drive motors 24 is K, and the current value of the current that flows in the drive motors 24 to cause the cart body 10 to rest is Is. Thus, the weight of the load B can be easily acquired by the aforementioned formula (5) utilizing the current value of the drive motors 24.

According to the first embodiment, as hereinabove described, the controller 28 determines whether or not the cart body 10 is at rest on the basis of the movement speed detected by the speed sensors 26. Thus, whether or not the cart body 10 is at rest can be reliably determined, and hence the weight of the load B can be reliably acquired.

According to the first embodiment, as hereinabove described, the controller 28 determines whether or not the cart body 10 is at rest at a prescribed time interval (according to the first embodiment, every two seconds) and acquires the weight of the load B placed on the cart body 10 when determining that the cart body 10 is at rest. Thus, the weight of the load B can be acquired at the prescribed time interval, and hence the weight of the current load B can be promptly acquired even when the load B placed on the cart body 10 is increased or decreased in weight.

According to the first embodiment, as hereinabove described, the speed sensors 26 detect the movement speed of the cart body 10 by detecting the rotation speed of the shafts of the drive motors 24. Thus, the movement speed of the cart body 10 can be easily detected by the speed sensors 26.

According to the first embodiment, as hereinabove described, the controller 28 outputs the assist drive force according to the operation force detected by the operation force sensors 21. Thus, the assist drive force appropriate for the operation force of the user can be output unlike the case where the assist drive force is acquired regardless of the operation force of the user. Consequently, assistance in walking of the user provided by the excessive assist drive force can be suppressed, and hence walking of the user can be stably assisted.

According to the first embodiment, as hereinabove described, the operation force sensors 21 are provided in the grip portion 13. Thus, the operation force sensors 21 are provided in the grip portion 13 to which the operation force is transmitted from the user, and hence the operation force of the user can be reliably and accurately detected by the operation force sensors 21.

According to the first embodiment, as hereinabove described, the inclination sensor 22 includes the acceleration sensor. Thus, the inclination angle of the cart body 10 can be easily detected by the acceleration sensor.

(Second Embodiment)

A second embodiment is now described with reference to FIGS. 1 to 4 and 8. In this second embodiment, assist drive force of a magnitude that cancels out the component force of gravity in the inclination direction of an inclined surface caused by the weight of a load B and the weight of a cart body 10 on the inclined surface is output in addition to the structure of the aforementioned first embodiment in which the assist drive force of the magnitude that cancels out inertia force caused by at least the weight of the load B is output.

In a walking assist cart 200 according to the second embodiment of the present invention, the load B is placed on the cart body 10, as shown in FIG. 1. The walking assist cart 200 includes a controller 128, as shown in FIG. 2. Portions of the walking assist cart 200 similar to those of the walking assist cart 100 according to the aforementioned first embodiment are denoted by the same reference numerals, to omit the description.

Similarly to the aforementioned first embodiment, the controller 128 performs rest control of causing the cart body 10 to rest and acquires the weight of the load B placed on the cart body on the basis of rest drive force (see FIG. 3) and the inclination angle (see FIG. 3) of the cart body when causing the cart body 10 to rest. Furthermore, the controller 128 acquires assist drive force in a direction to cancel out inertia force caused by the weight of the load B and of a magnitude that cancels out the inertia force caused by at least the weight of the load B according to the acquired weight of the load B and outputs the assist drive force.

As shown in FIG. 3, the component force (Fg in FIG. 3) of gravity in the inclination direction of the inclined surface caused by the weight of the load B and the weight of the cart body 10 is generated in the cart body 10 when the cart body 10 is arranged on the inclined surface. Therefore, on the inclined surface, a user is required to apply more operation force due to the component force of gravity, as compared with the case where the walking assist cart 200 moves over the level ground.

According to the second embodiment, the controller 128 outputs assist drive force in a direction to cancel out the component force (Fg in FIG. 3) of gravity in the inclination direction of the inclined surface caused by the weight of the load B and the weight of the cart body 10 on the inclined surface and of the magnitude that cancels out the component force (Fg in FIG. 3) of gravity according to the acquired weight of the load B when the cart body 10 is arranged on the inclined surface. The following is described setting the acquired assist drive force as Fa, the operation force of the user as Fh, the component force of gravity as Fg (=(M+m) g·sin θ), the weight of the cart body 10 as M, the weight of the load B as m, the gravity acceleration as g, a road surface gradient as θ, and a partition coefficient as α. The partition coefficient α has a value that is at least 0 and not more than 1 and is a value properly determined at the time of design, similarly to the aforementioned first embodiment.

Specifically, the controller 128 acquires the assist drive force Fa on the basis of the following formula (8).

$$Fh:(Fa-Fg)=\alpha \cdot M:\{m+(1-\alpha)M\} \qquad (8)$$

The formula (8) is a formula expressing a ratio of force that the user bears to force that drive motors 24 bear. In the formula (8), the term (Fa−Fg) shows that the drive motors 24 generate drive force corresponding to the component force Fg of gravity as a fixed value. When α=1, for example, the formula (8) shows that the user bears inertia force caused by the weight M of the cart body 10 and the drive motors 24 bear inertia force (Fa−Fg) caused by the weight m of the load B and the component force Fg of the gravity. Therefore, the assist drive force Fa is acquired (calculated) such that the operation force Fh of the user and the assist drive force Fa yield the ratio of the formula (8), whereby the assist drive force Fa of the magnitude that cancels out the inertia force caused by at least the weight m of the load B and the magnitude that cancels out the component force Fg of gravity can be acquired. Consequently, the walking assist cart 200 bears the inertia force caused by the weight m of the load B, and hence the user is unaware of the inertia force caused by the weight m of the load. In addition, when the walking assist cart 200 is arranged on the inclined surface, the walking assist cart 200 bears the component force Fg of gravity, and hence on the inclined surface, the user can operate the walking assist cart 200 by operating feeling similar to that on the level ground.

Figure 8:
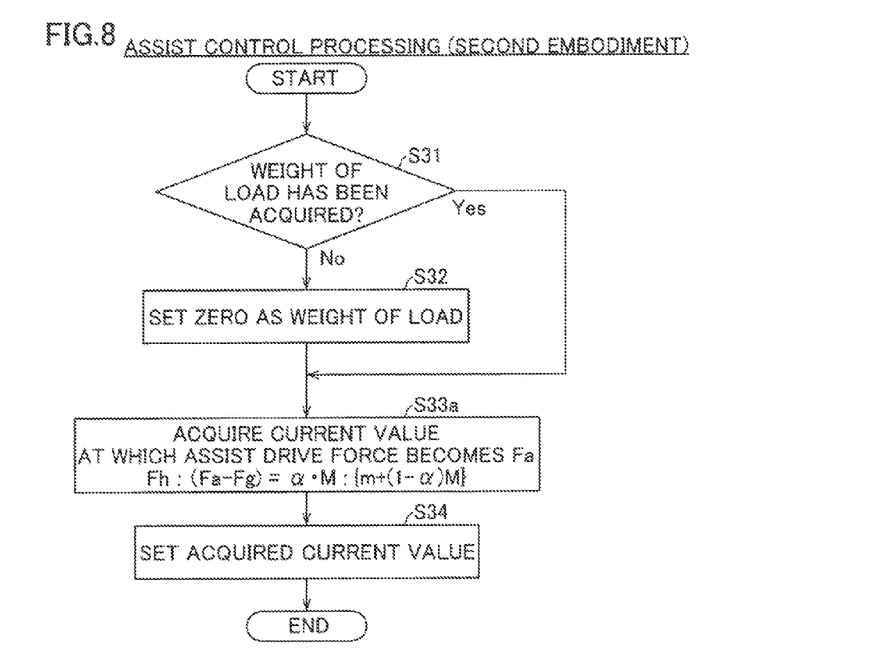
FIG. 8 is a flowchart for illustrating assist control processing in a walking assist cart according to a second embodiment of the present invention.

Assist control processing at the step S3 of the drive control processing shown in FIG. 4 in the walking assist cart 200 according to the second embodiment is now described in detail on the basis of a flowchart with reference to FIG. 8. Processing similar to the processing in the walking assist cart 100 according to the aforementioned first embodiment shown in FIG. 7 is denoted by the same numerals, and the description is omitted.

As shown in FIG. 8, the controller 128 determines whether or not the weight m of the load has been acquired at a step S31. When determining that the weight m of the load has been acquired, the controller 128 advances to a step S33a. When determining that the weight m of the load has not been acquired, the controller 128 sets zero as the weight m of the load at a step S32 and advances to the step S33a. A prescribed value other than zero may be set as the weight m of the load.

At the step S33a, the controller 128 acquires (calculates) a current value at which the assist drive force becomes Fa.

Specifically, the controller 128 acquires (calculates) a current value corresponding to the assist drive force Fa acquired (calculated) on the basis of the aforementioned formula (8). Then, after executing processing at a step S34, the controller 128 terminates the assist control processing and returns to the step S1 (see FIG. 4) in the drive control processing.

The remaining structure of the walking assist cart 200 according to the second embodiment is similar to that of the walking assist cart 100 according to the aforementioned first embodiment.

According to the second embodiment, the following effects can be obtained.

According to the second embodiment, as hereinabove described, the controller 128 acquires the weight (m) of the load B placed on the cart body 10 on the basis of the rest drive force (Fs=K·Is) of the drive motors 24 and the inclination angle (θ) of the cart body 10 and acquires the assist drive force (Fa) to assist walking of the user on the basis of the acquired weight of the load B. Thus, walking of the user can be assisted on the basis of the weight of the load B placed on the cart body 10 while an increase in the number of components is suppressed, similarly to the aforementioned first embodiment.

According to the second embodiment, as hereinabove described, the controller 128 outputs the assist drive force in the direction to cancel out the component force (Fg=(m+M) g·sin θ) of gravity in the inclination direction of the inclined surface caused by the weight of the load B on the inclined surface and of the magnitude that cancels out the component force of gravity in the inclination direction of the inclined surface caused by at least the weight of the load B according to the acquired weight of the load B when the cart body is arranged on the inclined surface. Thus, the assist drive force in the direction to cancel out the component force of gravity in the inclination direction of the inclined surface caused by the weight of the load B can be output according to the weight of the load B placed on the cart body on the inclined surface on which a burden is easily imposed according to the weight of the load B. Consequently, walking of the user can be more properly assisted. Furthermore, the component force of gravity in the inclination direction of the inclined surface caused by the weight of the load B can be reliably canceled out by the assist drive force, and hence a burden on the user during walking on the inclined surface can be reliably reduced.

According to the second embodiment, as hereinabove described, the controller 128 outputs the assist drive force in the direction to cancel out the component force of gravity in the inclination direction of the inclined surface caused by the weight of the load B and the weight of the cart body 10 and of the magnitude that cancels out the component force of gravity in the inclination direction of the inclined surface caused by the weight of the load B and the weight of the cart body 10. Thus, the assist drive force in the direction to cancel out not only the component force of gravity in the inclination direction of the inclined surface caused by the weight of the load B but also the component force of gravity in the inclination direction of the inclined surface caused by the weight of the cart body 10 can be output. Consequently, walking of the user can be more properly assisted. Furthermore, not only the component force of gravity in the inclination direction of the inclined surface caused by the weight of the load B but also the component force of gravity in the inclination direction of the inclined surface caused by the weight of the cart body 10 can be reliably canceled out by the assist drive force, and hence a burden on the user during walking on the inclined surface can be further reduced.

According to the second embodiment, as hereinabove described, the controller 128 outputs the assist drive force by the aforementioned formula (8), where the operation force of the user is Fh, the assist drive force is Fa, the component force of gravity in the inclination direction of the inclined surface caused by the weight of the load B and the weight of the cart body 10 is Fg, the weight of the cart body 10 is M, the weight of the load B is m, and the coefficient having a value that is at least 0 and not more than 1 is α. Thus, the assist drive force can be easily acquired in consideration of the weight of the load B, the weight of the cart body 10, the operation force of the user, and the component force of gravity in the inclination direction of the inclined surface caused by the weight of the load B and the weight of the cart body 10 by the aforementioned formula (8).

The remaining effects of the second embodiment are similar to those of the aforementioned first embodiment.

(Third Embodiment)

A third embodiment is now described with reference to FIGS. 1 to 4 and 9 to 11. In this third embodiment, rest drive force (Fs=K·Is) is acquired in consideration of the frictional resistance of a road surface etc., whereby the weight of a load is acquired, unlike the aforementioned first and second embodiments.

In a walking assist cart 300 according to the third embodiment of the present invention, a load B is placed on a cart body 10, as shown in FIG. 1. The walking assist cart 300 includes a controller 228, as shown in FIG. 2. Portions of the walking assist cart 300 similar to those of the walking assist carts 100 and 200 according to the aforementioned first and second embodiments are denoted by the same reference numerals, to omit the description.

The controller 228 performs rest control of causing the cart body 10 to rest and acquires the weight of the load B placed on the cart body on the basis of the rest drive force (see FIG. 3) and the inclination angle (see FIG. 3) of the cart body when causing the cart body 10 to rest, similarly to the aforementioned first and second embodiments. Furthermore, the controller 228 outputs assist drive force according to the acquired weight of the load B.

The current value of current that flows in drive motors 24 to cause the cart body 10 to rest conceivably varies from rest current value acquisition operation to rest current value acquisition operation by frictional resistance between mechanical components of the drive motors 24, frictional resistance between drive wheels 11 and the road surface, etc. even on the same road surface. When frictional resistance acts in a direction opposite to that of the rest drive force of the drive motors 24, for example, the rest drive force and the component force of gravity are balanced at a current value slightly larger than an original current value for balance due to the frictional resistance. When frictional resistance acts in the same direction as that of the rest drive force of the drive motors 24, on the other hand, the rest drive force and the component force of gravity are balanced at a current value slightly smaller than the original current value for balance due to the frictional resistance. Therefore, a current value varying from rest current value acquisition operation to rest current value acquisition operation by the frictional resistance between the mechanical components of the drive motors 24, the frictional resistance between the drive wheels 11 and the road surface, etc. even on the same road surface is obtained. Consequently, variations are generated in the current value of the current that flows in the drive motors 24 to cause the cart body 10 to rest.

According to the third embodiment, the controller 228 gradually reduces an absolute value for the current value of the current that flows in the drive motors 24 to cause the cart body 10 to rest after causing the cart body 10 to rest and causes the cart body 10 to rest again when the cart body 10 moves again in rest control processing of drive control processing (see FIG. 4). The controller 228 acquires the weight of the load B placed on the cart body 10 on the basis of the current value of the current that flows in the drive motors 24 to cause the cart body 10 to rest and the inclination angle of the cart body 10 when causing the cart body 10 to rest again. Thus, even when the current value for causing the cart body 10 to rest becomes larger than a minimum current value necessary to cause the cart body 10 to rest (a current value in the case where frictional resistance acts in the same direction as that of the rest drive force of the drive motors 24), the cart body 10 is caused to rest again in order to obtain the minimum current value necessary to cause the cart body 10 to rest, and hence variations in the current value of the current that flows in the drive motors 24 to cause the cart body 10 to rest can be significantly reduced or prevented.

Figure 9:
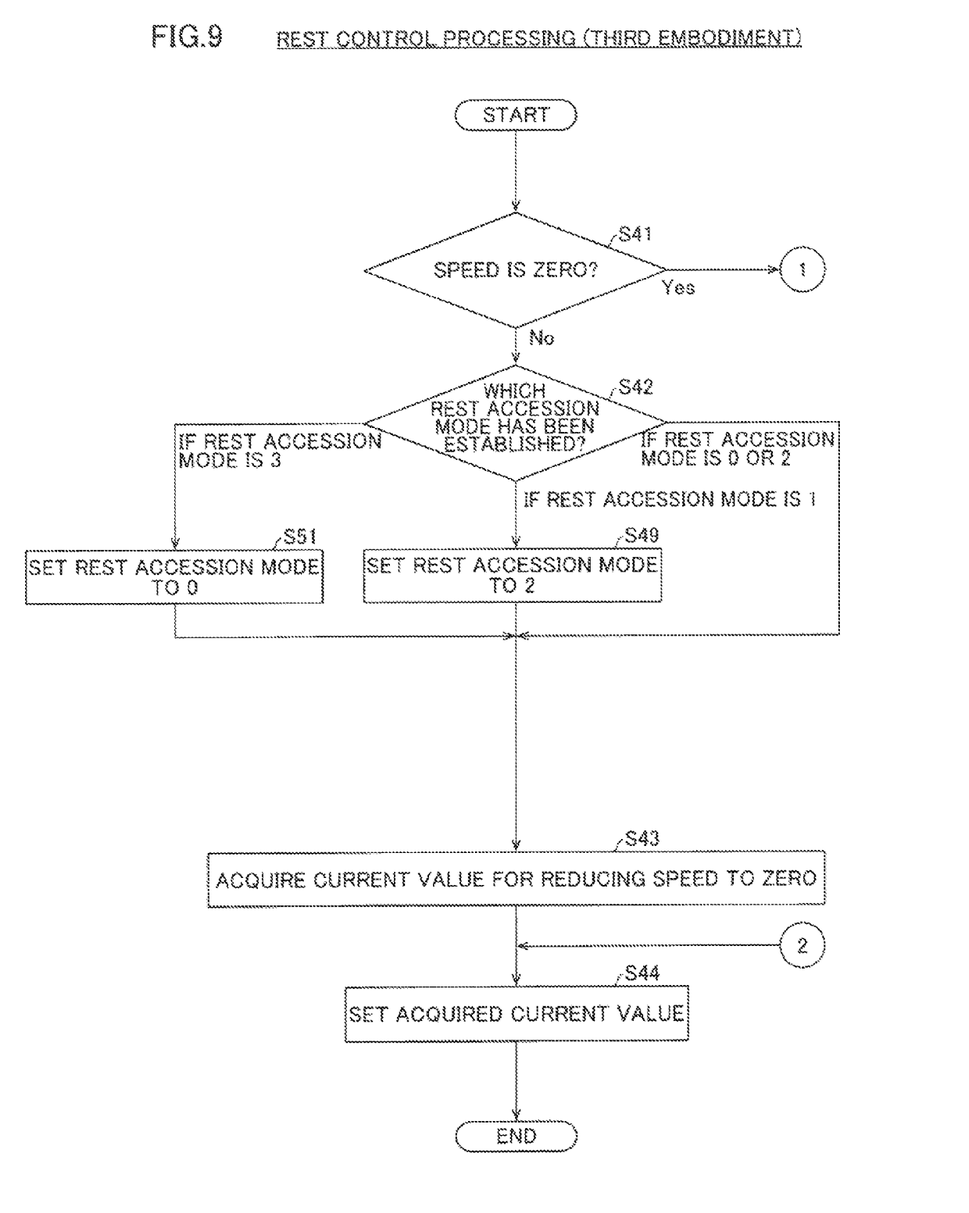
FIG. 9 is a flowchart for illustrating rest control processing in a walking assist cart according to a third embodiment of the present invention.
Figure 10:
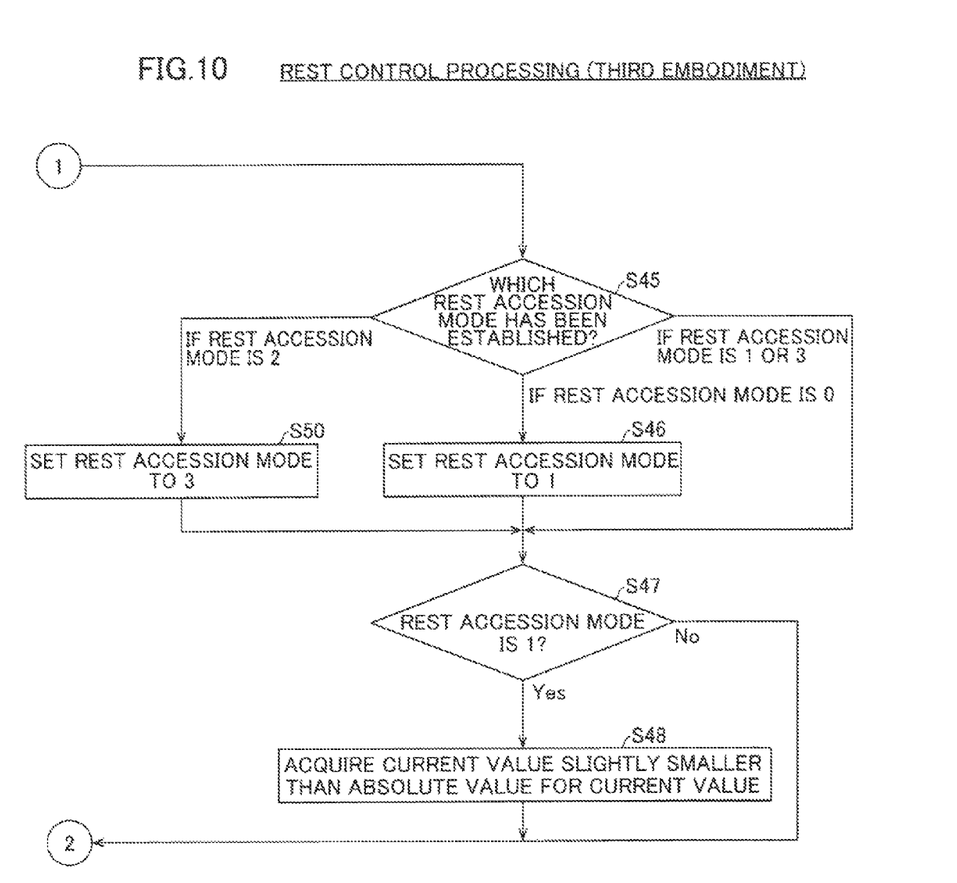
FIG. 10 is a flowchart showing a continuation of the rest control processing in FIG. 9.

The rest control processing at the step S2 of the drive control processing shown in FIG. 4 in the walking assist cart 300 according to the third embodiment is now described in detail on the basis of a flowchart with reference to FIGS. 9 and 10. Here, the rest control processing in the walking assist cart 300 is described in chronological order from when a user releases his/her hand from a grip portion 13. For ease of understanding, assume that the controller 228 continues to determine that the operation force of the user has not been detected (No) at the step S1 in the drive control processing shown in FIG. 4.

As shown in FIG. 9, the controller 228 determines whether or not the speed is zero at a step S41. Specifically, the controller 228 determines whether or not the movement speed of the cart body 10 acquired by two speed sensors 26 is zero. When determining that the movement speed of the cart body 10 is zero, the controller 228 advances to a step S45.

When determining that the movement speed of the cart body 10 is not zero, the controller 228 advances to a step S42. When the user releases his/her hand from the grip portion 13, the movement speed of the cart body 10 may not be zero, and hence the controller 228 advances to the step S42.

At the step S42, the controller 228 determines which rest accession mode has been established. The rest accession mode denotes a set value for determining at which stage of the rest control the walking assist cart 300 is. The rest accession mode is assigned a value from 0 to 3, and as the number is increased, the stage of the rest control proceeds. In this walking assist cart 300, the rest accession mode is set to 0 when the user releases his/her hand from the grip portion 13 (i.e. when the operation force has not been detected). Therefore, the controller 228 determines that the rest accession mode is 0 at the step S42 and advances to a step S43 without changing the setting of the rest accession mode.

At the step S43, the controller 228 acquires (calculates) a current value for achieving a state where the speed is zero in order to cause the cart body 10 to rest.

At a step S44, the controller 228 sets the current value acquired at the step S43 in a motor driver 23. Thus, the magnitude (current value) of the current that flows in the drive motors 24 is controlled by the motor driver 23, and the movement speed of the cart body 10 is reduced. Then, the controller 228 returns to the step S41 through the step S1 in FIG. 4 and repeats the processing at the steps S41 to S44 until the movement speed of the cart body 10 is reduced to zero. When the movement speed of the cart body 10 is reduced to zero, the controller 228 determines that the movement speed of the cart body 10 is zero at the step S41 and advances to a step S45 (see FIG. 10).

As shown in FIG. 10, the controller 228 determines which rest accession mode has been established at the step S45. The rest accession mode is set to 0 in initial processing when the user releases his/her hand from the grip portion 13, and hence the controller 228 advances to a step S46.

At the step S46, the controller 228 sets the rest accession mode to 1 (a value indicating the first rest state). Then, the controller 228 advances to a step S47.

At the step S47, the controller 228 determines whether or not the rest accession mode is 1. The rest accession mode is set to 1 at the step S46, and hence the controller 228 determines that the rest accession mode is 1 and advances to a step S48.

At the step S48, the controller 228 acquires a current value slightly smaller than an absolute value for the current value of the current that currently flows in the drive motors 24. Then, the controller 228 advances to the step S44 (see FIG. 9). The reason why the absolute value for the current value is used here is that the polarity of the current varied by the direction of the rest drive force is taken into consideration. As shown in FIG. 9, the controller 228 sets the current value acquired at the step S48 in the motor driver 23 at the step S44. Thus, the magnitude (current value) of the current that flows in the drive motors 24 is controlled by the motor driver 23, and the rest drive force is adjusted. Then, the controller 28 returns to the step S41 through the step S1 in FIG. 4 and repeats the processing at the steps S45 to S48 and S44 until the cart body 10 is moved again. Thus, the controller 228 gradually reduces the absolute value for the current value of the current that flows in the drive motors 24 to cause the cart body 10 to rest after causing the cart body 10 to rest. When the cart body 10 is moved again, the controller 228 determines that the movement speed of the cart body 10 is not zero at the step S41 and advances to the step S42. At the step S42, the controller 228 determines that the rest accession mode is 1 and advances to a step S49.

At the step S49, the controller 228 sets the rest accession mode to 2 (a value indicating a state where the first rest state has been released). Then, the controller 228 advances to the step S43. The cart body 10 is moving, and hence the controller 228 acquires (calculates) a current value for achieving a state where the movement speed of the cart body 10 is zero. After setting the current value acquired at the step S43 in the motor driver 23 at the step S44, the controller 228 returns to the step S41 through the step S1 in FIG. 4. At the step S41, the controller 228 determines that the movement speed of the cart body 10 is not zero and advances to the step S42. The rest accession mode has been set to 2, and hence the controller 228 advances to the step S43 without changing the setting of the rest accession mode at the step S42. Then, the controller 228 executes the processing at the steps S43 and S44 and executes the processing at the steps S41 to S44 until the movement speed of the cart body 10 is reduced to zero. Thus, the controller 228 causes the cart body 10 to rest again when the cart body 10 is moved again. When the movement speed of the cart body 10 is reduced to zero, the controller 228 advances to the step S45 again. As shown in FIG. 10, the controller 228 determines that the rest accession mode is 2 at the step S45 and advances to a step S50.

At the step S50, the controller 228 sets the rest accession mode to 3 (a value indicating the second rest state). The current value is a current value Is corresponding to the rest drive force when the rest accession mode is set to 3. Then, the controller 228 acquires the current value of the current that flows in the drive motors 24 in this rest accession mode 3 in load weight acquisition processing described later, shown in FIG. 11. Then, the controller 228 acquires the weight of the load B on the basis of the current value of the current that flows in the drive motors 24 and the inclination angle of the cart body 10. Thereafter, the controller 228 repeats the rest control processing unless the operation force has been detected at the step S1 in FIG. 4. When the operation force has been detected at the step S1 in FIG. 4, the controller 228 performs assist control shown in FIG. 7.

When the user ejects the load B from the cart body 10 and the cart body 10 starts to move after the rest accession mode is set to 3, the controller 228 determines that the movement speed of the cart body 10 is not zero at the step S41 and advances to the step S42. At the step S42, the controller 228 determines that the rest accession mode is 3 and advances to a step S51. At the step S51, the controller 228 sets the rest accession mode to 0. Thus, the controller 228 performs rest control again from a state where the rest accession mode is 0.

Figure 11:
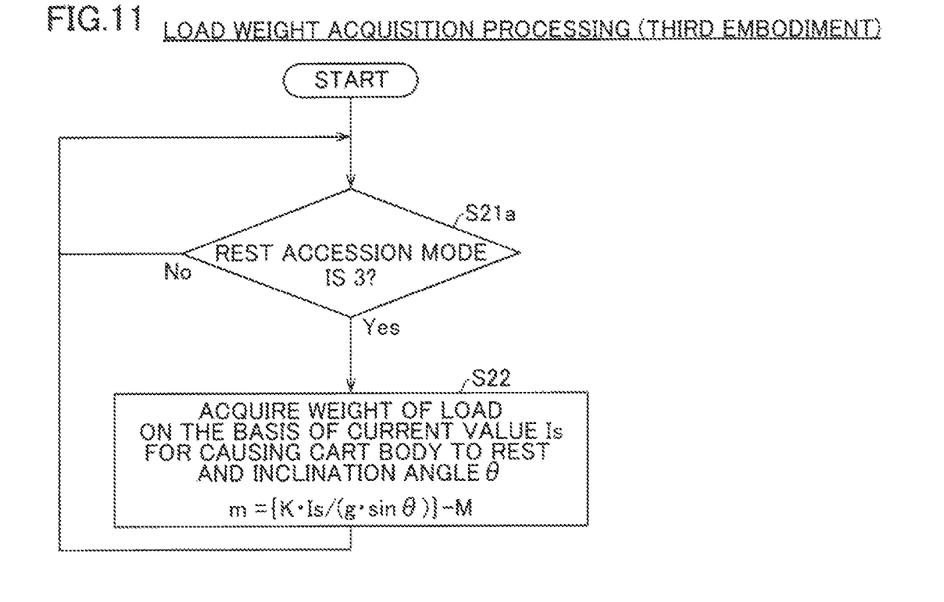
FIG. 11 is a flowchart for illustrating load weight acquisition processing in the walking assist cart according to the third embodiment of the present invention.

The load weight acquisition processing in the walking assist cart 300 according to the third embodiment is now described on the basis of a flowchart with reference to FIG. 11. Processing similar to the processing in the walking assist cart 100 according to the aforementioned first embodiment shown in FIG. 6 is denoted by the same numerals, and the description is omitted.

As shown in FIG. 11, the controller 228 determines whether or not the rest accession mode is 3 at a step S21a. More specifically, the controller 228 determines whether or not the cart body 10 is at rest again after the cart body 10 is moved again. When determining that the rest accession mode is not 3, the controller 228 repeats the processing at the step S21a. When determining that the rest accession mode is 3, the controller 228 advances to a step S22 and acquires (calculates) the weight m of the load B on the basis of the current value Is for causing the cart body 10 to rest and the inclination angle (road surface gradient) θ.

The remaining structure of the walking assist cart 300 according to the third embodiment is similar to that of the walking assist cart 100 according to the aforementioned first embodiment.

According to the third embodiment, the following effects can be obtained.

According to the third embodiment, as hereinabove described, the controller 228 acquires the weight (m) of the load B placed on the cart body 10 on the basis of the rest drive force (Fs=K·Is) of the drive motors 24 and the inclination angle (θ) of the cart body 10 and acquires the assist drive force (Fa) to assist walking of the user on the basis of the acquired weight of the load B. Thus, walking of the user can be assisted on the basis of the weight of the load B placed on the cart body 10 while an increase in the number of components is suppressed, similarly to the aforementioned first embodiment.

According to the third embodiment, as hereinabove described, the controller 228 gradually reduces the absolute value for the current value of the current that flows in the drive motors 24 to cause the cart body 10 to rest after causing the cart body 10 to rest and causes the cart body 10 to rest again when the cart body 10 is moved again. Furthermore, the controller 228 acquires the weight of the load B placed on the cart body 10 on the basis of the current value of the current that flows in the drive motors 24 to cause the cart body 10 to rest and the inclination angle of the cart body 10 when causing the cart body 10 to rest again. Thus, even when the current value for causing the cart body 10 to rest becomes larger than a minimum current value necessary to cause the cart body 10 to rest, the cart body 10 is caused to rest again in order to obtain the minimum current value necessary to cause the cart body 10 to rest, and hence variations in the current value of the current that flows in the drive motors 24 to cause the cart body 10 to rest can be significantly reduced or prevented. Consequently, variations in the weight of the load B acquired on the basis of at least the current value can be significantly reduced or prevented. Therefore, variations in the assist drive force acquired on the basis of the weight of the load B can be significantly reduced or prevented, and hence the user can receive stable walking assistance.

The remaining effects of the third embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the acceleration sensor is employed as the inclination sensor 22 in each of the aforementioned first to third embodiments, the present invention is not restricted to this. According to the present invention, a sensor other than the acceleration sensor may alternatively be employed as the inclination sensor. For example, a gyro sensor may be employed as the inclination sensor. Alternatively, both the gyro sensor and the acceleration sensor may be employed as the inclination sensor.

While the weight of the load B is acquired on the basis of the rest drive force of the drive motors 24 and the inclination angle of the cart body 10 in each of the aforementioned first to third embodiments, the present invention is not restricted to this. According to the present invention, the weight of the load B may alternatively be acquired on the basis of drive force other than the rest drive force and the inclination angle of the cart body 10.

While the current sensors 25 detect the current that flows in the drive motors 24 in each of the aforementioned first to third embodiments, the present invention is not restricted to this. According to the present invention, the controller may alternatively detect the current that flows in the drive motors.

While the current that flows in the drive motors 24 is detected by the current sensors 25 to detect the drive force of the drive motors 24 in each of the aforementioned first to third embodiments, the present invention is not restricted to this. According to the present invention, other than the current is detected to detect the drive force of the drive motors 24.

While the assist drive force of the magnitude that cancels out the inertia force caused by at least the weight of the load B is output in the aforementioned first embodiment, the present invention is not restricted to this. According to the present invention, assist drive force of a magnitude that cancels out a portion of the inertia force caused by the weight of the load B may alternatively be output so far as the assist drive force is output according to the weight of the load B.

While the assist drive force of the magnitude that cancels out the component force (Fg in FIG. 3) of gravity in the inclination direction of the inclined surface caused by the weight of the load B and the weight of the cart body 10 on the inclined surface is output in the aforementioned second embodiment, the present invention is not restricted to this. According to the present invention, assist drive force of a magnitude that cancels out a portion of the component force of gravity in the inclination direction of the inclined surface caused by the weight of the load B and the weight of the cart body 10 on the inclined surface may alternatively be output. Furthermore, according to the present invention, assist drive force of a magnitude that cancels out a portion of or all of the component force of gravity in the inclination direction of the inclined surface caused by only the weight of the load B on the inclined surface may alternatively be output.

While the processing operations performed by the controller 28 (128, 228) according to the present invention are described, using the flowcharts described in a flow-driven manner in which processing is performed in order along a processing flow for the convenience of illustration in each of the aforementioned first to third embodiments, the present invention is not restricted to this. According to the present invention, the processing operations performed by the controller 28 (128, 228) may alternatively be performed in an event-driven manner in which processing is performed on an event basis. In this case, the processing operations performed by the controller may be performed in a complete event-driven manner or in a combination of an event-driven manner and a flow-driven manner.

What is claimed is:

1. A walking assist cart comprising:
a cart body including a drive wheel, on which a load is placed;
a drive portion that drives the drive wheel;
an inclination sensor that detects an inclination angle of the cart body; and
a controller that calculates a weight of the load placed on the cart body based on drive force of the drive portion and the inclination angle of the cart body and outputs assist drive force to assist walking of a user based on the weight of the load that is calculated.

2. The walking assist cart according to claim 1, wherein the drive force of the drive portion includes rest drive force to cause the cart body to rest, and
the controller causes the cart body to rest, calculates the weight of the load placed on the cart body based on the rest drive force and the inclination angle of the cart body caused to rest when causing the cart body to rest, and outputs the assist drive force in a direction to cancel out force caused by the weight of the load and of a magnitude that cancels out the force caused by at least the weight of the load according to the weight of the load that is calculated.

3. The walking assist cart according to claim 2, wherein the controller outputs the assist drive force of a magnitude that cancels out at least a portion of force caused by a weight of the cart body in addition to the force caused by the weight of the load.

4. The walking assist cart according to claim 3, wherein the controller outputs the assist drive force by a following formula (1):

$$Fh/Fa = \alpha \cdot M / \{m + (1-\alpha)M\} \quad (1)$$

where operation force of the user is Fh, the assist drive force is Fa, the weight of the cart body is M, the weight of the load is m, and a coefficient having a value that is at least 0 and not more than 1 is $\alpha$.

5. The walking assist cart according to claim 2, wherein the controller outputs the assist drive force in a direction to cancel out component force of gravity in an inclination direction of an inclined surface caused by the weight of the load on the inclined surface and of a magnitude that cancels out the component force of gravity in the inclination direction of the inclined surface caused by at least the weight of the load according to the weight of the load that is calculated when the cart body is arranged on the inclined surface.

6. The walking assist cart according to claim 3, wherein the controller outputs the assist drive force in a direction to cancel out component force of gravity in an inclination direction of an inclined surface caused by the weight of the load and the weight of the cart body on the inclined surface and of a magnitude that cancels out the component force of gravity in the inclination direction of the inclined surface caused by the weight of the load and the weight of the cart body according to the weight of the load that is calculated when the cart body is arranged on the inclined surface.

7. The walking assist cart according to claim 6, wherein the controller outputs the assist drive force by a following formula (2):

$$Fh/(Fa-Fg) = \alpha \cdot M / \{m + (1-\alpha)M\} \quad (2)$$

where operation force of the user is Fh, the assist drive force is Fa, the component force of gravity in the inclination direction of the inclined surface caused by the weight of the load and the weight of the cart body is Fg, the weight of the cart body is M, the weight of the load is m, and a coefficient having a value that is at least 0 and not more than 1 is $\alpha$.

8. The walking assist cart according to claim 7, wherein the drive portion includes a drive motor, and
the controller causes the cart body to rest and calculates the weight of the load placed on the cart body based on a current value of current that flows in the drive motor to cause the cart body to rest and the inclination angle of the cart body when causing the cart body to rest.

9. The walking assist cart according to claim 8, wherein the controller calculates the weight of the load placed on the cart body by a following formula (3):

$$m = \{K \cdot Is / (g \cdot \sin \theta)\} - M \quad (3)$$

where the weight of the cart body is M, the weight of the load is m, the inclination angle of the cart body is $\theta$, gravity acceleration is g, a proportional constant related to the drive motor is K, and the current value of the current that flows in the drive motor to cause the cart body to rest is Is.

10. The walking assist cart according to claim 2, wherein the drive portion includes a drive motor,
the controller gradually reduces an absolute value for a current value of current that flows in the drive motor to cause the cart body to rest after causing the cart body to rest and causes the cart body to rest again when the cart body is moved again, and
the controller calculates the weight of the load placed on the cart body based on the current value of the current that flows in the drive motor to cause the cart body to rest and the inclination angle of the cart body when causing the cart body to rest again.

11. The walking assist cart according to claim 3, wherein the drive portion includes a drive motor, the controller gradually reduces an absolute value for a current value of current that flows in the drive motor to cause the cart body to rest after causing the cart body to rest and causes the cart body to rest again when the cart body is moved again, and the controller calculates the weight of the load placed on the cart body based on the current value of the current that flows in the drive motor to cause the cart body to rest and the inclination angle of the cart body when causing the cart body to rest again.

12. The walking assist cart according to claim 5, wherein the drive portion includes a drive motor, the controller gradually reduces an absolute value for a current value of current that flows in the drive motor to cause the cart body to rest after causing the cart body to rest and causes the cart body to rest again when the cart body is moved again, and the controller calculates the weight of the load placed on the cart body based on the current value of the current that flows in the drive motor to cause the cart body to rest and the inclination angle of the cart body when causing the cart body to rest again.

13. The walking assist cart according to claim 6, wherein the drive portion includes a drive motor, the controller gradually reduces an absolute value for a current value of current that flows in the drive motor to cause the cart body to rest after causing the cart body to rest and causes the cart body to rest again when the cart body is moved again, and the controller calculates the weight of the load placed on the cart body based on the current value of the current that flows in the drive motor to cause the cart body to rest and the inclination angle of the cart body when causing the cart body to rest again.

14. The walking assist cart according to claim 7, wherein the drive portion includes a drive motor, the controller gradually reduces an absolute value for a current value of current that flows in the drive motor to cause the cart body to rest after causing the cart body to rest and causes the cart body to rest again when the cart body is moved again, and the controller calculates the weight of the load placed on the cart body based on the current value of the current that flows in the drive motor to cause the cart body to rest and the inclination angle of the cart body when causing the cart body to rest again.

15. The walking assist cart according to claim 2, further comprising a speed sensor that detects a movement speed of the cart body, wherein the controller determines whether or not the cart body is at rest based on the movement speed detected by the speed sensor.

16. The walking assist cart according to claim 15, wherein the controller determines whether or not the cart body is at rest at a prescribed time interval and calculates the weight of the load placed on the cart body when determining that the cart body is at rest.

17. The walking assist cart according to claim 15, wherein the speed sensor detects the movement speed of the cart body by detecting a rotation speed of the drive portion.

18. The walking assist cart according to claim 1, further comprising an operation force sensor that detects operation force of the user on the cart body, wherein the controller outputs the assist drive force according to the operation force detected by the operation force sensor.

19. The walking assist cart according to claim 18, further comprising a grip portion gripped by the user, wherein the operation force sensor is provided in the grip portion.

20. The walking assist cart according to claim 1, wherein the inclination sensor includes an acceleration sensor or a gyro sensor.

* * * * *